US009217099B2

(12) United States Patent
Mahoney et al.

(10) Patent No.: US 9,217,099 B2
(45) Date of Patent: Dec. 22, 2015

(54) PRESSURE-SENSITIVE ADHESIVES WITH ACID-EPOXY CROSSLINKING SYSTEMS

(71) Applicant: 3M INNOVATIVE PROPERTIES COMPANY, St. Paul, MN (US)

(72) Inventors: Wayne S. Mahoney, St. Paul, MN (US); Arlin L. Weikel, Roberts, WI (US); Larry R. Krepski, White Bear Lake, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 49 days.

(21) Appl. No.: 13/798,807

(22) Filed: Mar. 13, 2013

(65) Prior Publication Data
US 2013/0196152 A1 Aug. 1, 2013

Related U.S. Application Data

(63) Continuation-in-part of application No. PCT/US2012/037735, filed on May 14, 2012.

(60) Provisional application No. 61/500,404, filed on Jun. 23, 2011.

(51) Int. Cl.
*C09J 133/14* (2006.01)
*C08L 33/06* (2006.01)
*C09J 133/06* (2006.01)
*C09J 163/00* (2006.01)
*C08G 59/32* (2006.01)
*C08G 59/68* (2006.01)
*C09J 7/02* (2006.01)

(52) U.S. Cl.
CPC ........... *C09J 133/14* (2013.01); *C08G 59/3209* (2013.01); *C08G 59/68* (2013.01); *C08L 33/062* (2013.01); *C09J 7/0217* (2013.01); *C09J 133/062* (2013.01); *C09J 163/00* (2013.01); *C09J 7/0207* (2013.01); *Y10T 428/287* (2015.01)

(58) Field of Classification Search
CPC ... C08L 33/062; C09J 133/062; C09J 7/0217; C09J 7/0207; Y10T 428/287; C08G 59/00; C08G 59/14; C08G 59/18; C08G 59/20; C08G 59/68; C08G 59/3209; B32B 37/12; B32B 15/082; B32B 15/092; B32B 15/09
See application file for complete search history.

(56) References Cited

U.S. PATENT DOCUMENTS

| 3,018,262 | A | | 1/1962 | Schroeder |
|---|---|---|---|---|
| 3,117,099 | A | | 1/1964 | Proops |
| 3,691,140 | A | | 9/1972 | Silver |
| 3,708,296 | A | | 1/1973 | Schlesinger |
| 4,069,055 | A | | 1/1978 | Crivello |
| 4,166,152 | A | | 8/1979 | Baker |
| 4,216,288 | A | | 8/1980 | Crivello |
| 4,250,311 | A | | 2/1981 | Crivello |
| 4,279,717 | A | | 7/1981 | Eckberg |
| 4,619,979 | A | | 10/1986 | Kotnour |
| 4,636,432 | A | | 1/1987 | Shibano |
| 4,656,218 | A | | 4/1987 | Kinoshita |
| 4,751,138 | A | | 6/1988 | Tumey |
| 4,843,134 | A | | 6/1989 | Kotnour |
| 4,985,340 | A | | 1/1991 | Palazzotto |
| 5,045,569 | A | | 9/1991 | Delgado |
| 5,084,586 | A | | 1/1992 | Farooq |
| 5,086,088 | A | | 2/1992 | Kitano |
| 5,124,417 | A | | 6/1992 | Farooq |
| 5,506,279 | A | | 4/1996 | Babu |
| 5,554,664 | A | | 9/1996 | Lamanna |
| 5,637,646 | A | | 6/1997 | Ellis |
| 5,753,346 | A | | 5/1998 | Leir |
| 5,804,610 | A | | 9/1998 | Hamer |
| 5,902,836 | A | | 5/1999 | Bennett |
| 6,130,269 | A | * | 10/2000 | Hosokawa et al. ........... 522/100 |
| 6,211,261 | B1 | * | 4/2001 | Hosokawa et al. ............ 522/36 |
| 6,335,143 | B1 | | 1/2002 | Sumino |
| 6,949,297 | B2 | | 9/2005 | Yang |
| 7,727,595 | B2 | * | 6/2010 | Gordon et al. ............ 427/385.5 |
| 2009/0047441 | A1 | | 2/2009 | Gordon |

FOREIGN PATENT DOCUMENTS

| EP | 0887706 | 12/1998 |
|---|---|---|
| WO | WO 81/00309 | 2/1981 |
| WO | WO 94/29358 | 12/1994 |
| WO | WO 2007/087399 | 8/2007 |
| WO | WO 2011/063070 | 5/2011 |
| WO | WO 2011/112643 | 9/2011 |
| WO | WO 2012/091817 | 7/2012 |
| WO | WO 2012/161997 | 11/2012 |

OTHER PUBLICATIONS

J. V. Cirvello et al., "Epoxidized Triglycerides as Renewable Monomers in Photoinitiated Cationic Polymerization", Chem. Mater. 4, 692-699 (1992).
Kirk-Othmer Encyclopedia of Chemical Technology, 4$^{th}$ Edition, Supplement Volume, John Wiley and Sons, New York, pp. 253-255.
Steven L. Murov, Handbook of Photochemistry, Marcel Dekker Inc., N.Y., 27-35 (1973).
J.V. Cirvello et al., "The Effects of Polyols as Chain Transfer Agents and Flexibilizers in Photoinitiated Cationic Photopolymerization", Journal of Radiation Curing, Oct. 1986, 3-9.

(Continued)

*Primary Examiner* — Satya Sastri

(74) *Attorney, Agent, or Firm* — Carolyn A. Fischer

(57) ABSTRACT

A pre-adhesive composition is described comprising an acid-functional (meth)acryloyl copolymer and epoxy resin, which when crosslinked with or without using an ionic photoacid generator (PAG) provides a (e.g. pressure-sensitive) adhesive.

17 Claims, No Drawings

(56) References Cited

OTHER PUBLICATIONS

International Search Report PCT/US2012/037735 Aug. 28, 2012, 3 pgs.

Z. Czech et al., "UV-crosslinked Acrylic Pressure-Sensitive Adhesive Systems Containing Unsaturated Ethers", Polimery 2007, 52, pp. 438-442.

Jason C. Yarbrough et al., "Contact Angle Analysis, Surface Dynamics, and Biofouling Characteristics of Cross-Linkable, Random Perfluoropolyether-Based Graft Terpolymers", Macromolecules 2006, 39, pp. 2521-2528.

U.S. Appl. No. 61/778,838, filed Mar. 13, 2013.

U.S. Appl. No. 13/798,884, filed Mar. 13, 2013.

* cited by examiner

PRESSURE-SENSITIVE ADHESIVES WITH ACID-EPOXY CROSSLINKING SYSTEMS

BACKGROUND

Pressure-sensitive tapes are virtually ubiquitous in the home and workplace. In one of its simplest configuration, a pressure-sensitive tape includes an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted by A.V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures (e.g., 70° C.) for 10,000 minutes. Increased shear holding capability has generally been accomplished by crosslinking the PSA, although considerable care must be exercised so that high levels of tack and adhesion are retained in order to preserve the aforementioned balance of properties.

There are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen. A particular issue for the electronics industry and other applications in which PSAs contact a metal surface is the generation of corrosive or toxic by-products and the generation of undesirable color.

SUMMARY

In one embodiment, a (meth)acrylic solute copolymer includes interpolymerized monomers that include: (e.g. 85 to 99 parts by weight of) an alkyl(meth)acrylate; (e.g. 1 to 20 parts by weight of) optionally an epoxy-functional (meth) acryloyl monomer; and (e.g. 1 to 15 parts by weight of) an acid-functional ethylenically unsaturated monomer. Thus, the solute copolymer is acid-functional and optionally epoxy-functional. The adhesive composition further comprises an epoxy resin having on average greater than 1 polymerizable epoxy groups per molecule. In each of these embodiments, the (meth)acrylic solute copolymer optionally comprises interpolymerized monomers that include (e.g. 0.5 to 10 parts by weight of) a non-acid-functional polar monomer; (e.g. 0.5 to 5 parts by weight of) a vinyl monomer; based on 100 parts by weight of the total monomer in the polymer. The crosslinkable composition may further comprise 0.01 to 5 parts by weight of a multifunctional (meth)acrylate, relative to 100 parts by weight of the copolymer.

When the (meth)acrylic solute copolymer comprises interpolymerized monomers of an acid-functional ethylenically unsaturated monomer, the acid groups of the solute copolymer and epoxy groups of the epoxy resin can crosslink in the absence of an ionic photoacid generator. Hence, the solute copolymer can crosslink with or without the inclusion of an ionic photoacid generator.

The present disclosure also provides pressure-sensitive adhesives prepared from the crosslinkable compositions (e.g., syrup compositions) described herein, as well as pressure-sensitive adhesive articles that include, for example, a coating of such adhesive. The pressure-sensitive adhesives, the crosslinked compositions, of this disclosure provide the desired balance of tack, peel adhesion, and shear holding power, and further conform to the Dahlquist criteria, i.e., the modulus of the adhesive at the application temperature, typically room temperature, is less than $3 \times 10^6$ dynes/cm at a frequency of 1 Hz.

In this application "pre-adhesive" refers to the mixture comprising an acid-functional and optionally epoxy-functional copolymer, epoxy resin, and optional PAG that may be crosslinked to form a pressure-sensitive adhesive.

"Syrup composition" refers to a solution of a solute (co) polymer in one or more solvent monomers, the composition having a viscosity of from 500 to 10,000 cPs at 22° C.

Herein, "(meth)acryloyl" is inclusive of (meth)acrylate and (meth)acrylamide.

Herein, "(meth)acrylic" includes both methacrylic and acrylic.

Herein, "(meth)acrylate" includes both methacrylate and acrylate.

The term "hydrocarbyl" means a saturated or unsaturated linear, branched, cyclic, or polycyclic hydrocarbon group. Unless otherwise indicated, the hydrocarbyl groups typically contain up to 30 carbon atoms, often up to 20 carbon atoms, and even more often up to 10 carbon atoms. This term is used to encompass alkyl, alkenyl, alkynyl groups, as well as cyclic groups such as alicyclic and aromatic groups, for example.

The term "heterohydrocarbyl" means a saturated or unsaturated linear, branched, cyclic, or polycyclic hydrocarbon group (unless otherwise indicated, typically containing up to 30 carbon atoms) having at least one catenary carbon atom replaced by a catenary heteroatom such as O, S, or N or containing functional groups such as amide, ester, urea, urethane or ether functional groups.

The term "(hetero)hydrocarbyl" includes both hydrocarbyl and heterohydrocarbyl.

Herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

When a group is present more than once in a formula described herein, each group is "independently" selected, whether specifically stated or not. For example, when more than one R group is present in a formula, each R group is independently selected.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

All numbers are herein assumed to be modified by the term "about" and preferably with the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

The present disclosure provides a pre-adhesive composition comprising an acid-functional (meth)acryloyl copolymer and epoxy resin, which when crosslinked with or without using an ionic photoacid generator (PAG) provides a pressure-sensitive adhesive and pressure-sensitive adhesive articles having desirable properties. In some embodiments, the copolymer is both acid and epoxy-functional.

Chlorinated triazine crosslinking agents are highly efficient and reliable UV crosslinkers and often used to prepare high performance PSAs. They are oxygen tolerant, have scavenging ability, and are able to cure (meth)acrylic compositions under low intensity light irradiation. However, the presence of chlorinated reagents can be undesirable in the electronics industry as well as in other applications such as medical tapes. Thus, eliminating a chlorinated triazine crosslinking agent is desirable in certain situations.

The present disclosure describes a new way to obtain high performance PSAs with an acid- and optionally epoxy-functional copolymer (e.g., isooctyl acrylate/acrylic acid/glycidyl methacrylate (IOA/AA/GMA) copolymer). In some embodiments, a very low level of PAG is utilized. Without being bound by theory, it is believed that the incipient acid of the PAG activates the epoxy ring in one polymer chain in-situ toward an epoxy group and/or an acid group in another polymer chain to produce a crosslinked polymer.

On irradiation with light energy, ionic photoacid generators undergo a fragmentation reaction and release one or more molecules of Lewis or Brönsted acid that catalyze the ring opening and addition of the pendent epoxy groups to form a crosslink. Useful photoacid generators are thermally stable and do not undergo thermally induced reactions with the copolymer, and are readily dissolved or dispersed in the crosslinkable composition. Preferred photoacid generators are those in which the incipient acid has a pKa value of ≤0. Photoacid generators are known and reference may be made to K. Dietliker, Chemistry and Technology of UV and EB Formulation for Coatings, Inks and Paints, vol. III, SITA Technology Ltd., London, 1991. Further reference may be made to Kirk-Othmer Encyclopedia of Chemical Technology, 4$^{th}$ Edition, Supplement Volume, John Wiley and Sons, New York, year, pp 253-255.

Cations useful as the cationic portion of the ionic photoinitiators of the invention include organic onium cations, for example those described in U.S. Pat. Nos. 4,250,311, 3,708,296, 4,069,055, 4,216,288, 5,084,586, 5,124,417, 5,554,664 and such descriptions incorporated herein by reference, including aliphatic or aromatic Group IVA VIIA (CAS version) centered onium salts, preferably I-, S-, P-, Se- N- and C-centered onium salts, such as those selected from, sulfoxonium, iodonium, sulfonium, selenonium, pyridinium, carbonium and phosphonium, and most preferably I-, and S-centered onium salts, such as those selected from sulfoxonium, diaryliodonium, triarylsulfonium, diarylalkylsulfonium, dialkylarylsulfonium, and trialkylsulfonium wherein "aryl" and "alkyl" are as defined and having up to four independently selected substituents. The substituents on the aryl or alkyl moieties will preferably have less than 30 carbon atoms and up to 10 heteroatoms selected from N, S, non-peroxidic O, P, As, Si, Sn, B, Ge, Te, Se. Examples include hydrocarbyl groups such as methyl, ethyl, butyl, dodecyl, tetracosanyl, benzyl, allyl, benzylidene, ethenyl and ethynyl; hydrocarbyloxy groups such as methoxy, butoxy and phenoxy; hydrocarbylmercapto groups such as methylmercapto and phenylmercapto; hydrocarbyloxycarbonyl groups such as methoxycarbonyl and phenoxycarbonyl; hydrocarbylcarbonyl groups such as formyl, acetyl and benzoyl; hydrocarbylcarbonyloxy groups such as acetoxy and cyclohexanecarbonyloxy; hydrocarbylcarbonamido groups such as acetamido and benzamido; azo; boryl; halo groups such as chloro, bromo, iodo and fluoro; hydroxy; oxo; diphenylarsino; diphenylstilbino; trimethylgermano; trimethylsiloxy; and aromatic groups such as cyclopentadienyl, phenyl, tolyl, naphthyl, and indenyl. With the sulfonium salts, it is possible for the substituent to be further substituted with a dialkyl- or diarylsulfonium cation; an example of this would be 1,4-phenylene bis(diphenylsulfonium).

The nature of the counteranion in an ionic PAG can influence the rate and extent of cationic addition polymerization of the epoxy groups. For example, J. V. Crivello, and R. Narayan, Chem. Mater., 4, 692, (1992), report that the order of reactivity among commonly used normucleophilic anions is $SbF_6^- > AsF_6^- > PF_6^- > BF_4^-$. The influence of the anion on reactivity has been ascribed to three principle factors: (1) the acidity of the protonic or Lewis acid generated, (2) the degree of ion-pair separation in the propagating cationic chain and (3) the susceptibility of the anions to fluoride abstraction and consequent chain termination. $B(C_6F_5)_4^-$ may also be used.

Useful onium salts include diazonium salts, such as aryl diazonium salts; halonium salts, such as diarlyiodonium salts; sulfonium salts, such as triarylsulfonium salts; selenonium salts, such as triarylselenonium salts; sulfoxonium salts, such as triarylsulfoxonium salts; and other miscellaneous classes of onium salts such as triaryl phosphonium and arsonium salts, and pyrylium and thiopyrylium salts.

Useful ionic photoacid generators include bis(4-t-butylphenyl) iodonium hexafluoroantimonate (FP5034™ from Hampford Research Inc., Stratford, Conn.), a mixture of triarylsulfonium salts (diphenyl(4-phenylthio) phenylsulfonium hexafluoroantimonate, bis(4-(diphenylsulfonio)phenyl)sulfide hexafluoroantimonate) available as Syna P1-6976™ from Synasia Metuchen, N.J., (4-methoxyphenyl) phenyl iodonium triflate, bis(4-tert-butylphenyl) iodonium camphorsulfonate, bis(4-tert-butylphenyl) iodonium hexafluoroantimonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, ([4-(octyloxy)phenyl]phenyliodonium hexafluorophosphate), ([4-(octyloxy) phenyl]phenyliodonium hexafluoroantimonate), (4-isopropylphenyl)(4-methylphenyl)iodonium tetrakis (pentafluorophenyl) borate (available s Rhodorsil 2074™ from Bluestar Silicones, East Brunswick, N.J.), bis(4-methylphenyl) iodonium hexafluorophosphate (available as Omnicat 440™ from IGM Resins Bartlett, Ill.), 4-(2-hydroxy-1-tetradecyloxy)phenyl]phenyl iodonium hexafluoroantimonate, triphenyl sulfonium hexafluoroantimonate (available as CT-548™ from Chitec Technology Corp. Taipei, Taiwan), diphenyl(4-phenylthio)phenylsulfonium hexafluorophosphate, bis(4-(diphenylsulfonio)phenyl)sulfide bis (hexafluorophosphate), diphenyl(4-phenylthio)phenylsulfonium hexafluoroantimonate, bis(4-(diphenylsulfonio) phenyl)sulfide hexafluoroantimonate, and blends of these triarylsulfonium salts available from Synasia, Metuchen, N.J. under the trade designations of Syna PI-6992™ and Syna PI-6976™ for the $PF_6$ and $SbF_6$ salts, respectively.

The photoacid generator is used in amounts sufficient to effect the desired degree of crosslinking of the copolymer. The desired degree of crosslinking may vary, depending on the desired adhesive properties and the film thickness. The amount of the photoacid generator necessary to effect the desired degree of crosslinking will depend on the quantum yield of the photoacid generator (the number of molecules acid release per photon absorbed), the pKa of the acid, the permeability of the polymer matrix, the wavelength and duration of irradiation and the temperature. Generally the photoacid generator is used in amounts of 0.01 to 1 parts by weight, preferably 0.1 to 0.5, parts by weight relative to 100 parts by weight of total monomer/copolymer.

Optionally, it is within the scope of this invention to include photosensitizers or photoaccelerators with the photoacid generators. Use of photosensitizers or photoaccelerators alters the wavelength sensitivity of radiation-sensitive compositions employing the latent catalysts and photoacid generators of this invention. This is particularly advantageous when the photoacid generator does not strongly absorb the incident radiation. Use of photosensitizers or photoaccelerators increases the radiation sensitivity, allowing shorter exposure times and/or use of less powerful sources of radiation. Any photosensitizer or photoaccelerator may be useful if its triplet energy is at least 30 kilocalories per mole. Examples of such photosensitizers are given in Table 2-1 of the reference Steven L. Murov, Handbook of Photochemistry, Marcel Dekker Inc., N.Y., 27-35 (1973), and include those described in U.S. Pat. No. 4,985,340 (Palazzotto et al.), and such description is incorporated herein by reference. When present, the amount of photosensitizer or photoaccelerator used in the practice of the present invention is generally less than 10 and preferably less than 1.0 wt % of photosensitizer or photoaccelerator based on the weight of the photoacid generator.

The (meth)acryloyl copolymer comprises epoxy-functional monomers. An exemplary epoxy-functional (meth) acryloyl monomer is of the formula:

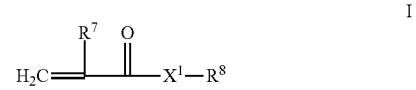

I wherein:
$R^7$ is —H or $C_1$-$C_4$ alkyl;
$X^1$ is —$NR^9$— or —O—; and
$R^8$ is an epoxy-substituted (hetero)hydrocarbyl group.

Preferably, the $R^8$ group is based on a straight-chain, branched, cyclic or polycyclic hydrocarbon of 2 to 30 carbons having an oxirane (epoxy) group included. More preferably, the $R^8$ group contains 3 to 10 carbons, such as glycidyl methacrylate (GMA). Some embodiments contain an epoxycyclohexyl group such as 3,4-epoxycyclohexylmethyl(meth)acrylate and 3-(2,3-epoxypropoxy)phenyl acrylate, 2-[4-(2,3-epoxypropoxy)phenyl]-2-(4-acryloyloxy-phenyl)propane, 4-(2,3-epoxypropoxy)cyclohexyl acrylate, 2,3-epoxycyclohexyl acrylate, and the acrylic acid monoester of poly(bisphenol-A diglycidyl ether), commercially available as Ebecryl™ 3605, from Cytec Industries., Woodland Park, N.J., and species having $R^8$ according to the formula: —$[(CH_2)_5C(O)O]_n$—$CH_2$-epoxycyclohexyl, wherein n is 0 to 10 and preferably 1-4.

In one useful embodiment, the epoxy functional monomer is derived from the reaction of vinyldimethyl azlactone with a hydroxyalkyl epoxy compound as shown in Scheme 1:

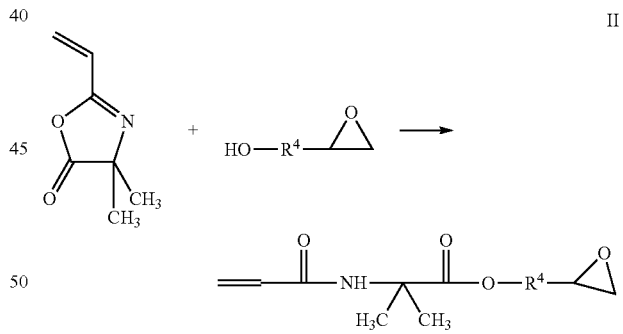

II where $R^4$ is a $C_1$-$C_6$ alkylene.

Some preferred epoxy monomers are of the formula:

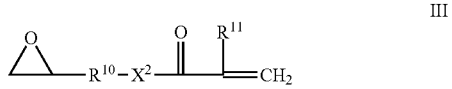

III wherein:
$R^{10}$ is a (hetero)hydrocarbyl group, preferably a hydrocarbyl group;
$R^{11}$ is —H or $C_1$-$C_4$ alkyl; and
$X^2$ is —$NR^{12}$— or —O—.

The epoxy-functional (meth)acryloyl monomer is used in an amount of no greater than 20 parts by weight, relative to 100 parts by weight of the total monomer content of the epoxy-functional (meth)acrylic copolymer. In certain embodiments, the epoxy-functional (meth)acryloyl monomer is used in an amount of 1 to 20 parts by weight, relative to 100 parts by weight of the total monomer content of the epoxy-functional (meth)acryl copolymer. In some embodiments, the epoxy-functional monomer is used in amounts of 1 to 10 parts by, relative to 100 parts by weight of the total monomer.

In addition to the epoxy-functional monomer, the copolymer comprises other monomers including for example, a (meth)acrylic acid ester (i.e., a (meth)acrylate ester monomer, also referred to as an alkyl(meth)acrylate), an acid-functional ethylenically unsaturated monomer, a second, non-acid-functional polar monomer, and a vinyl monomer. Furthermore, a multifunctional (meth)acrylate can be used in the (meth)acrylic copolymer to provide additional crosslinking and adhesive property enhancement.

A (meth)acrylate ester monomer useful in preparing the (meth)acrylic copolymer is a monomeric (meth)acrylic acid ester of a non-tertiary alcohol, which alcohol contains from 1 to 14 carbon atoms and preferably an average of from 4 to 12 carbon atoms.

Examples of monomers suitable for use as the (meth)acrylate ester monomer include an esters of either acrylic acid or methacrylic acid with a non-tertiary alcohol such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth)acrylate ester monomer is the ester of (meth)acrylic acid with an alcohol derived from a renewable sources, such as 2-octanol, citronellol or dihydrocitronellol.

In some embodiments, it is desirable for the (meth)acrylic acid ester monomer component include a high $T_g$ monomer, have a $T_g$ of at least 25° C., and preferably at least 50° C. As used herein, the term "$T_g$" of a monomer refers to the glass transition temperature of a homopolymer prepared from that monomer. Suitable high Tg monomers include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations. The $T_g$ of the copolymer may be estimated by use of the Fox equation, based on the $T_g$s of the constituent monomers and the weight percent thereof.

The (meth)acrylate ester monomer is typically used in an amount of 85 to 99 parts by weight, based on 100 parts by weight of the total monomer. Preferably, the (meth)acrylate ester monomer is used in an amount of 90 to 95 parts by weight of the 100 parts of the total monomer. When high $T_g$ monomers are included, the copolymer may include up to 30 parts by weight, preferably up to 20 parts by weight of the 85 to 99 parts by weight of (meth)acrylate ester monomer component.

The (meth)acrylic copolymer further includes an acid-functional ethylenically unsaturated monomer, where the acid-functional group may be an acid per se, such as a carboxylic acid, or a portion may be salt thereof, such as an alkali metal carboxylate. Useful acid-functional ethylenically unsaturated monomers include, but are not limited to, those selected from an ethylenically unsaturated carboxylic acid, ethylenically unsaturated sulfonic acid, ethylenically unsaturated phosphonic acid, and mixtures thereof. Examples of such compounds include those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid, and mixtures thereof.

Due to their availability, acid-functional ethylenically unsaturated monomers of the acid-functional and optionally epoxy-functional (meth)acrylic copolymer are generally selected from ethylenically unsaturated carboxylic acids, i.e., (meth)acrylic acids. When an even stronger acid is desired, an acid-functional ethylenically unsaturated monomer includes an ethylenically unsaturated sulfonic acid, an ethylenically unsaturated phosphonic acid, or a mixture thereof.

The acid-functional ethylenically unsaturated monomer is generally used in an amount of at least 1 part by weight, based on 100 parts by weight of the total monomer content that would form an unmodified acid-functional (meth)acrylic copolymer. The acid-functional ethylenically unsaturated monomer is generally used in an amount of no greater than 15 parts by weight, and often no greater than 10 parts by weight of the 100 parts of the total monomer content. In certain embodiments, 1 part to 15 parts by weight acid-functional ethylenically unsaturated monomer is used, based on 100 parts by weight of the total monomer content of the (meth)acrylic copolymer.

In certain embodiments, a non-acid-functional polar monomer is used in making the (meth)acrylic copolymer. As used herein, the term "polar monomer" is exclusive of an acid-functional ethylenically unsaturated monomer, and is referred to as a "non-acid-functional polar monomer."

Representative examples of a suitable non-acid-functional polar monomer includes, but is not limited, to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl(meth)acrylate, 2-ethoxyethyl (meth)acrylate, 2-methoxyethoxyethyl(meth)acrylate, 2-methoxyethyl methacrylate, polyethylene glycol mono (meth)acrylates and mixtures thereof. Preferred polar monomers include those selected from the group consisting of 2-hydroxyethyl(meth)acrylate and N-vinylpyrrolidinone.

A non-acid-functional polar monomer may be used in an amount of 0 to 10 parts by weight, based on 100 parts by weight of the total monomer content. In certain embodiments, such monomer is used in an amount of at least 0.5 part by weight of the 100 parts of the total monomer content. In certain embodiments, such monomer is used in an amount of no greater than 5 parts by weight of the 100 parts of the total monomer content of the (meth)acrylic copolymer.

When used, vinyl monomers useful in the (meth)acrylic copolymer include a styrene, substituted styrene (e.g., α-methyl styrene), vinyl halide, and mixtures thereof. As used herein, the term "vinyl monomer" is exclusive of an acid-functional ethylenically unsaturated monomer, an acrylate ester monomer, and a polar monomer.

A vinyl monomer may be used in an amount of 0 to 5 parts by weight, based on 100 parts by weight of the total monomer content that would form an unmodified acid-functional (meth)acrylic copolymer. In certain embodiments, such monomer is used in an amount of at least 1 part by weight of the 100 parts of the total monomer content of the (meth) acrylic copolymer.

Preferably the copolymer contains no allyl ether, vinyl ether or vinyl ester monomer units.

In order to increase cohesive strength of the coated adhesive composition, a multifunctional (meth)acrylate monomer may be incorporated into the blend of polymerizable monomers to assist in crosslinking. Such compounds are often referred to as chemical crosslinking agents. A multifunctional (meth)acrylate is particularly useful for syrup polymerization. Examples of useful multifunctional (meth)acrylates include, but are not limited to, di(meth)acrylates, tri(meth)acrylates, and tetra(meth)acrylates, such as 1,6-hexanediol di(meth)acrylate, poly(ethylene glycol)di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition.

If used, typically, a multifunctional (meth)acrylate is used in an amount of less than 5 parts by weight, relative to 100 parts by weight of the total monomer content of the (meth) acrylic copolymer. In certain embodiments, a multifunctional (meth)acrylate crosslinker may be present in an amount of less than 1 part by weight. In certain embodiments, such chemical crosslinker is used in an amount of at least 0.01 part by weight. In certain embodiments, such chemical crosslinker is used in an amount of at least 0.05 part by weight. In some embodiments the crosslinking compositions contain no multifunctional (meth)acrylates.

One method of preparing (meth)acrylic copolymers includes partially polymerizing monomers to produce a syrup composition comprising the solute (meth)acrylic copolymer and unpolymerized solvent monomers. Partial polymerization provides a coatable solution of the (meth)acrylic solute polymer in one or more free-radically polymerizable solvent monomers. Generally, the optional PAG and the epoxy resin is added to the partially polymerized composition, then coated on a suitable substrate and further polymerized. When exposed the UV radiation, the extant photoinitiator free radically polymerizes the solvent monomers, while the PAG initiates polymerization and crosslinking of the epoxy resin and the pendent epoxy groups of the copolymers. When using a syrup polymer method, the ionic photoacid generator is used in an amount of 0.01 to 1 part by weight, relative to 100 parts by weight of solute copolymer and solvent monomer(s).

It will be understood that a syrup polymerization method will produce a "dead polymer" in the initial free radical polymerization; i.e. a fully polymerized, not free-radically polymerizable polymer. Subsequently the solvent monomers do not free-radically polymerize onto the extant solute copolymer. Upon compounding the syrup with the optional PAG and epoxy resin, further exposure to UV initiates free radical polymerization of the solvent monomers to produce a distinct copolymer. Concurrently, the PAG initiates cationic polymerization of the epoxy groups of the epoxy resin, the pendent epoxy groups of the solute copolymer and the pendent epoxy groups of the copolymer resulting from the solvent monomers.

The syrup method provides advantages over solvent or solution polymerization methods; the syrup method yielding higher molecular weights. These higher molecular weights increase the amount of chain entanglements, thus increasing cohesive strength. Also, the distance between cross-links can be greater with high molecular syrup polymer, which allows for increased wet-out onto a surface.

Herein a crosslinkable composition is provided that includes a solute polymer comprising a plurality of polymerized monomer units comprising pendent acid units, optionally in combination with pendent epoxy (or oxirane) units, and a component comprising a free-radically polymerizable solvent monomer and (optionally additional unreacted solvent monomers described supra); a photoinitiator; an epoxy resin, an optional PAG, and optionally a multifunctional (meth)acrylate chemical crosslinking agent.

The polymerizations is preferably conducted in the absence of solvents such as ethyl acetate, toluene and tetrahydrofuran, which are non-reactive with the functional groups of the components of the syrup composition. Solvents influence the rate of incorporation of different monomers in the polymer chain and generally lead to lower molecular weights as the polymers gel or precipitate from solution.

Polymerization of the (meth)acrylate solvent monomers can be accomplished by exposing the syrup composition to energy in the presence of a photoinitiator. Energy activated initiators may be unnecessary where, for example, ionizing radiation is used to initiate polymerization. Typically, a photoinitiator can be employed in a concentration of at least 0.0001 part by weight, preferably at least 0.001 part by weight, and more preferably at least 0.005 part by weight, relative to 100 parts by weight of the solvent monomer(s) of the unmodified (meth)acrylic copolymer. Typically, a photoinitiator can be employed in a concentration of no more than 3.0 parts by weight, preferably no more than 1.0 part by weight, and more preferably no more than 0.5 part by weight, relative to 100 parts by weight of the total monomer content.

A preferred method of preparation of the syrup composition is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals. The solute polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup composition. While an acceptable method, this procedure involving a highly converted functional polymer is not preferred because an additional solvent removal step is required, another material may be required (a non-monomeric solvent), and dissolution of the high molecular weight, highly converted solute polymer in the monomer mixture may require a significant period of time.

Useful photoinitiators include benzoin ethers such as benzoin methyl ether and benzoin isopropyl ether; substituted acetophenones such as 2,2-dimethoxy-2-phenylacetophenone photoinitiator, available under the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone;

aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the copolymer has been formed, i.e., photoinitiator can be added to the syrup composition. Such polymerizable photoinitiators are described, for example, in U.S. Pat. Nos. 5,902,836 and 5,506,279 (Gaddam et al.).

The syrup composition and the photoinitiator may be irradiated with activating UV radiation to polymerize the monomer component(s). UV light sources can be of two types: 1) relatively low light intensity sources such as blacklights, which provide generally 10 mW/cm² or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm², preferably 15 to 450 mW/cm². Where actinic radiation is used to fully or partially polymerize the syrup composition, high intensities and short exposure times are preferred. For example, an intensity of 600 mW/cm² and an exposure time of about 1 second may be used successfully. Intensities can range from 0.1 to 150 mW/cm², preferably from 0.5 to 100 mW/cm², and more preferably from 0.5 to 50 mW/cm². Such photoinitiators preferably are present in an amount of from 0.1 to 1.0 part by weight, relative to 100 parts by weight of the total monomer content that would form an unmodified acid-functional (meth)acrylic copolymer. Accordingly, relatively thick coatings can be achieved when the extinction coefficient of the photoinitiator is low.

The degree of conversion can be monitored during the irradiation by measuring the index of refraction of the polymerizing medium as previously described. Useful coating viscosities are achieved with conversions (i.e., the percentage of available monomer polymerized) in the range of up to 30%, preferably 2% to 20%, more preferably from 5% to 15%, and most preferably from 7% to 12%. The molecular weight (weight average) of the solute polymer(s) is at least 100,000, preferably at least 500,000.

When preparing (meth)acrylic copolymers described herein, it is expedient for the photoinitiated polymerization reactions to proceed to virtual completion, i.e., depletion of the monomeric components, at temperatures less than 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup composition and formation of the crosslinked pressure-sensitive adhesives. Free radical polymerization inhibitors are often required at processing temperatures of 70° C. and higher for reaction periods of more than 6 to 10 hours.

The composition further comprises an epoxy resin. Suitable epoxy resins include monomeric or oligomeric epoxy compounds that can be aliphatic, alicyclic, aromatic, or heterocyclic. These materials generally have, on the average, ≥1 polymerizable epoxy group per molecule. Some epoxy resins have ≥1.5 or ≥2 polymerizable epoxy groups per molecule. The oligomeric epoxides can be linear oligomers having terminal epoxy groups (for example, a diglycidyl ether of a polyoxyalkylene glycol), oligomers having skeletal epoxy units (for example, polybutadiene polyepoxide), or oligomers having pendent epoxy groups (for example, a glycidyl methacrylate oligomer or co-oligomer). The epoxides can be pure compounds or can be mixtures of compounds containing one, two, or more epoxy groups per molecule. These epoxy-containing materials can have a backbone of any type and with any suitable substituent group thereon that does not substantially interfere with cationic cure. Illustrative of permissible substituent groups include halogens, ester groups, ethers, sulfonate groups, siloxane groups, nitro groups, phosphate groups, and the like. The average molecular weight of the epoxy-containing materials can vary from about 58 g/mole to about 1000 g/mole or more.

Useful epoxy resins include glycidyl ether compounds of Formula IV

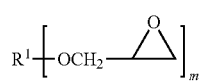

IV

Wherein $R^1$ is a (hetero)hydrocarbyl radical and m is 1 to 6. $R^1$ can be r an aliphatic group, aromatic group, or combination thereof. Exemplary epoxides are glycidyl ethers of polyhydric phenols that can be obtained by reacting a polyhydric phenol with an excess of a chlorohydrin such as epichlorohydrin (for example, the diglycidyl ether of 2,2-bis-(2,3-epoxypropoxyphenol)-propane). Additional examples of epoxides of this type are described in U.S. Pat. No. 3,018,262, and in Handbook of Epoxy Resins, Lee and Neville, McGraw-Hill Book Co., New York (1967).

Numerous commercially available epoxy resins can be utilized. In particular, epoxides that are readily available include resins of octadecylene oxide, epichlorohydrin, styrene oxide, vinyl cyclohexene oxide, glycidol, glycidyl methacrylate, diglycidyl ethers of Bisphenol A (for example, EPON 828, EPON 825, EPON 1004, and EPON 1001 from Momentive Specialty Chemicals) as well as DER 221, DER 332, and DER 334 from Dow Chemical Co., Midland, Mich.), vinylcyclohexene dioxide (for example, ERL 4206 from Union Carbide), 3,4-epoxycyclohexylmethyl-3,4-epoxycyclohexene carboxylate (for example, ERL 4221, CYRACURE UVR 6110, and CYRACURE UVR 6105 from Union Carbide), 3,4-epoxy-6-methylcyclohexylmethyl-3,4-epoxy-6-methyl-cyclohexene carboxylate (for example, ERL 4201 from Union Carbide), bis(3,4-epoxy-6-methylcyclohexylmethyl) adipate (for example, ERL 4289), bis(2,3-epoxycyclopentyl)ether (for example, ERL 0400), aliphatic epoxy modified from polypropylene glycol (for example, ERL 4050 and ERL 4052), dipentene dioxide (for example, ERL 4269), epoxidized polybutadiene (for example, OXIRON 2001 from FMC Corp.), silicone resin containing epoxy functionality, flame retardant epoxy resins such as brominated bisphenol-type epoxy resins (for example, DER 580), 1,4-butanediol diglycidyl ether of phenol formaldehyde novolak (for example, DEN 431 and DEN 438 from Dow Chemical), resorcinol diglycidyl ether (for example, KOPDXITE from Koppers Company, Inc.), bis(3,4-epoxycyclohexylmethyl) adipate (for example, ERL 4299 or CYRACURE UVR 6128), 2-(3,4-epoxycyclohexyl-5,5-spiro-3,4-epoxy)cyclohexane-meta-dioxane (for example, ERL-4234), vinylcyclohexene monoxide, 1,2-epoxyhexadecane (for example, CYRACURE UVR-6216), alkyl glycidyl ethers such as alkyl Cs—C 10 glycidyl ether (for example, HELOXY MODIFIER 7 from Resolution Performance Products), alkyl $C_{12}$-$C_{14}$ glycidyl ether (for example, HELOXY MODIFIER 8 from Momentive Specialty Chemicals), butyl glycidyl ether (for example, HELOXY MODIFIER 61 from), cresyl glycidyl ether (for example, HELOXY MODIFIER 62), p-tert-butylphenyl glycidyl ether (for example, HELOXY MODIFIER 65), polyfunctional glycidyl ethers such as diglycidyl ether of 1,4-butanediol (for example, HELOXY MODIFIER 67), diglycidyl ether of neopentyl glycol (for example, HELOXY MODIFIER 68), diglycidyl ether of cyclohexanedimethanol (for example, HELOXY MODIFIER 107), trimethylol ethane triglycidyl ether (for example, HELOXY MODIFIER 44), trimethylol propane triglycidyl ether (for example, HELOXY 48), polyglycidyl ether of an aliphatic polyol (for example, HELOXY MODIFIER 84), polyglycol diepoxide (for example, HELOXY MODIFIER 32), bisphenol F epoxides (for example, EPON 862 and Araldite GY-281 from Huntsman Advanced Materials), and 9,9-bis[4-(2,3-epoxypropoxy)-phenylfluorenone (for example, EPON 1079 from Momentive Specialty Chemicals).

Other useful epoxy-containing materials include those that contain cyclohexene oxide groups such as epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4-epoxy-6-methylcyclohexylmethyl) adipate. A more detailed list of useful epoxides of this nature is set forth in U.S. Pat. No. 3,117,099 (Proops et al).

Other useful epoxy resins are well known and contain such epoxides as epichlorohydrins, alkylene oxides (for example, propylene oxide), styrene oxide, alkenyl oxides (for example, butadiene oxide), and glycidyl esters (for example, ethyl glycidate). Still other useful epoxy resins include epoxy-functional silicones such as those described in U.S. Pat. No. 4,279,717 (Eckberg et al.), which are commercially available from the General Electric Company. These epoxy resins are polydimethylsiloxanes in which 1 to 20 mole percent of the silicon atoms have been substituted with epoxyalkyl groups (preferably, epoxy cyclohexylethyl, as described in U.S. Pat. No. 5,753,346 (Leir et al.)).

Blends of various epoxy-containing materials can also be utilized. Suitable blends can include two or more weight average molecular weight distributions of epoxy-containing compounds such as low molecular weight epoxides (e.g., having a weight average molecular weight below 200 g/mole), intermediate molecular weight epoxides (e.g., having a weight average molecular weight in the range of about 200 to 1000 g/mole), and higher molecular weight epoxides (e.g., having a weight average molecular weight above about 1000 g/mole). Alternatively or additionally, the epoxy resin can contain a blend of epoxy-containing materials having different chemical natures such as aliphatic and aromatic or different functionalities such as polar and non-polar. Other cationically-reactive polymers (such as vinyl ethers and the like) can additionally be incorporated, if desired.

In some embodiments, the crosslinkable adhesive composition contains 0.1 to 10 parts by weight of epoxy resin, relative to 100 parts by weight of the (meth)acrylic copolymer. Preferably the adhesive composition comprises 1 to 5 parts by weight of the epoxy resin.

The UV initiated crosslinking of the copolymers may be illustrated in the following Schemes 1 and 2. The ester, epoxy and optional acid monomer units are shown where the subscripts x, y and z correspond to the parts by weight of each monomer unit. It is believed to be a complex reaction mechanism between the pendent epoxy groups of the epoxy-functional copolymer, the epoxy groups of the epoxy resin, and the optional pendent acid groups of the epoxy functional copolymer.

It is believed a primary mechanism of crosslinking occurs between the pendent epoxy groups of the epoxy functional copolymer and those of the epoxy resin as illustrated in Scheme 1. In Scheme 1, an acid- and epoxy functional copolymer 1a having (meth)acrylate monomer units, optional acid-functional monomer units and epoxy-functional monomer units are shown. Copolymer 1a has a number of polymerized monomer units x, y and z, corresponding to the parts by weight of each monomer unit as previously described. Not shown are the non-acid functional polar monomer units, the vinyl monomer units, or the multifunctional (meth)acrylate monomer units. On irradiation with light energy, ionic photoacid generators undergo a fragmentation reaction and release one or more molecules of Lewis or Brönsted acid that catalyze the ring opening and addition of the pendent epoxy groups to form the oxonium functional polymer. This activated epoxy may be ring-opened by an epoxy resin of formula IV (or other described epoxy resins) to form intermediate 5. The intermediate 5 may continue to cationically polymerize adjacent epoxy groups from either the copolymer or the epoxy resin.

Alternatively, the incipient acid from the PAG may also protonate the epoxy groups of the epoxy resin which may then be ring-opened by an epoxy group pendent from the copolymer. As shown additional epoxy groups of the epoxy resin (shown with the subscript m-1 may react with adjacent epoxy groups and cationically polymerize. It will be further understood that the (meth)acrylate copolymer illustrated may be the original solute copolymer, or that copolymer produced from the secondary, UV-initiated free radical polymerization of the solvent monomers.

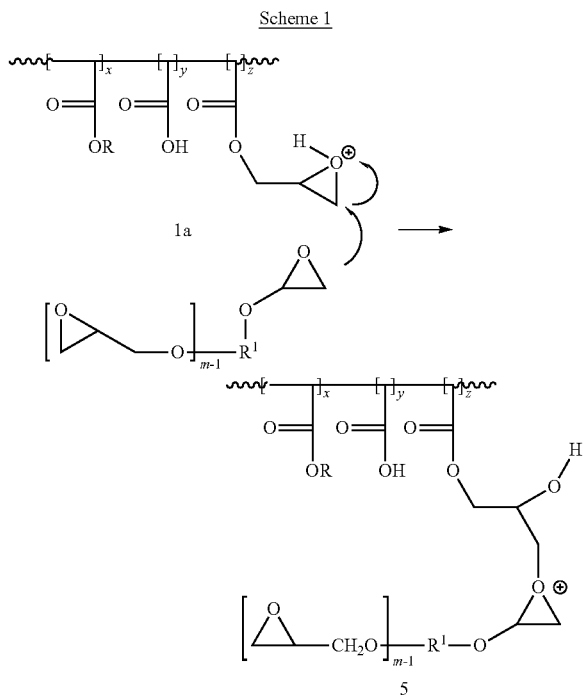

Scheme 1

Alternatively, the copolymer may be crosslinked as shown in the following Scheme 2. In Scheme 2, two acid- and epoxy functional copolymer 1a and 1b having (meth)acrylate monomer units, optional acid-functional monomer units and epoxy-functional monomer units are shown. Copolymers 1a and 1b have a number of polymerized monomer units x, y and z, corresponding to the parts by weight of each monomer unit as previously described. Not shown are the non-acid functional polar monomer units, the vinyl monomer units, or the multifunctional (meth)acrylate monomer units. On irradiation with light energy, ionic photoacid generators undergo a fragmentation reaction and release one or more molecules of Lewis or Brönsted acid which catalyze the ring opening and addition of the pendent epoxy groups to form the oxonium functional polymer 2. This activated epoxy 2 may be ring-opened by a pendent acid group of copolymer 1b to form intermediate 3, or may be ring-opened by the epoxy group of copolymer 1b to form intermediate 4. The intermediate 4 may continue to cationically polymerize adjacent epoxy groups. The hydroxyl group of intermediate 3 can further function as a chain transfer agent in the cationic polymerization of the epoxy groups, as described in J. V Crivello, D. A. Conlon, D. R. Olson "The Effects of Polyols as Chain Transfer Agents and Flexibilizers in Photoinitiated Cationic Photopolymerization", *Journal of Radiation Curing*, October 1986, 3-9. It will be further understood that the (meth)acrylate copolymer illustrated may be the original solute copolymer, or that copolymer produced from the secondary, UV-initiated free radical polymerization of the solvent monomers.

Scheme. 2

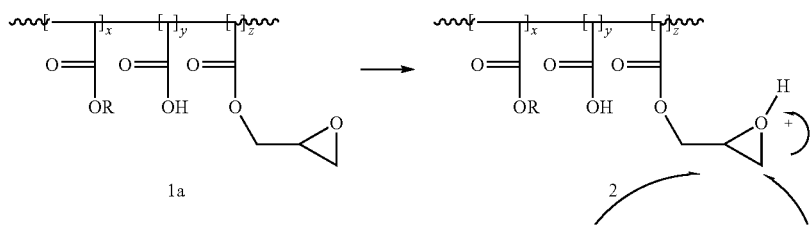

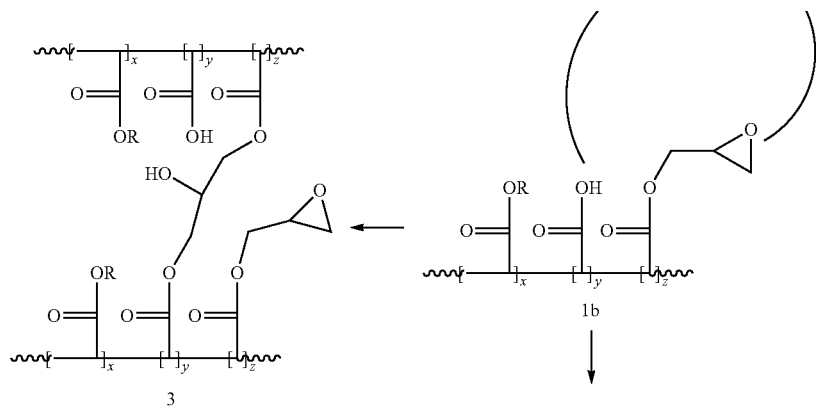

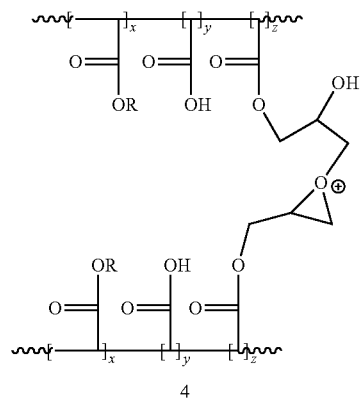

In yet another embodiment, when the solute (meth)acrylic copolymer comprises (e.g. carboxylic) acid functionality, the acid groups can be crosslinked with certain epoxy resin compounds in the absence of an ionic photoacid generator, as depicted by the following reaction scheme:

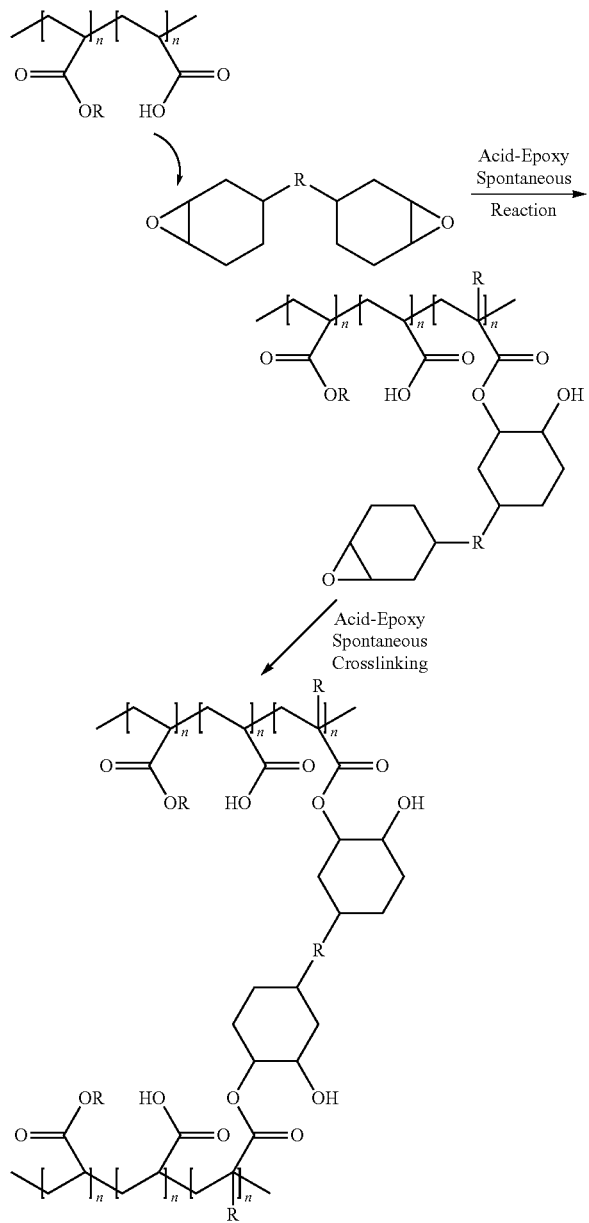

Additionally, when the solute (meth)acrylic copolymer comprises both pendent acid and epoxy functional groups, the copolymer can self-crosslink in the absence of both an ionic photoacid generator and an epoxy resin. Such reaction scheme, contrasted to the reaction scheme including an ionic photoacid generator, is as follows:

Thus, when the solute (meth)acrylic copolymer comprises both pendent acid and epoxy functional groups, the (meth) acrylic copolymer can self-crosslink and crosslink by means of the epoxy resin. When a PAG is utilized, the (meth)acrylic copolymer also crosslinks by a third crosslinking mechanism as previously described.

It is preferable to coat the adhesive composition soon after preparation. The adhesive polymer composition (containing the copolymer, monomers, epoxy resin and crosslinking agent), as a syrup, are easily coated upon suitable substrates, such as flexible backing materials, by conventional coating techniques, then further polymerized, and cured, to produce adhesive coated sheet materials. The flexible backing material may be any material conventionally utilized as a tape backing, optical film, or any other flexible material.

A pressure-sensitive adhesive composition may also contain one or more conventional additives. Preferred additives include tackifiers, plasticizers, dyes, antioxidants, and UV stabilizers. Such additives can be used if they do not affect the superior properties of the pressure-sensitive adhesives.

If tackifiers are used, then up to 50% by weight, preferably less than 30% by weight, and more preferably less than 5% by weight, based on the dry weight of the total adhesive polymer would be suitable. In some embodiments no tackifier is used. Suitable tackifiers for use with (meth)acrylate polymer dispersions include a rosin acid, a rosin ester, a terpene phenolic resin, a hydrocarbon resin, and a cumarone indene resin. The type and amount of tackifier can affect properties such as contactability, bonding range, bond strength, heat resistance and specific adhesion.

Adhesive articles may be prepared by coating the adhesive or pre-adhesive composition of a suitable support, such as a flexible backing. Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the disclosure include HOSTAPHAN 3SAB, primed polyester film (available from Mitsubishi Polyester Film Inc., Greer, S.C.), kraft paper (available from Monadnock Paper, Inc.); cellophane (available from Flexel Corp.); spun-bond poly(ethylene) and poly (propylene), such as TYVEK and TYPAR (available from DuPont, Inc.); and porous films obtained from poly(ethylene) and poly(propylene), such as TESLIN (available from PPG Industries, Inc.), and CELLGUARD (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure-sensitive adhesive compositions such as labels, tapes, signs, covers, marking indicia, and the like.

The above-described compositions can be coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. The composition may also be coated from the melt. These various methods of coating allow the compositions to be placed on the substrate at variable thicknesses thus allowing a wider range of use of the compositions. Coating thicknesses may vary as previously described. The syrup composition may be of any desirable concentration for subsequent coating, but is typically 5 to 20 wt-% polymer solids in monomer. The desired concentration may be achieved by further dilution of the coating composition, or by partial drying.

The flexible support may also include a release-coated substrate. Such substrates are typically employed when an adhesive transfer tape is provided. Examples of release-coated substrates are well known in the art and include, by way of example, silicone-coated Kraft paper, and the like. Tapes of the disclosure may also incorporate a low adhesion backing (LAB), which are known in the art.

EXAMPLES

Objects and advantages of this disclosure are further illustrated by the following examples, but the particular materials and amounts thereof recited in these examples, as well as other conditions and details, should not be construed to unduly limit this disclosure.

As used herein, "pph" refers to parts per one hundred parts of the monomers of the (meth)acrylic copolymer.

Test Methods

Peel Adhesion Test [ASTM D 3330/D 3330M-04]

The test measures the force required to peel the tape from glass at an angle of 180 degrees. The test was performed on conditioned tapes prepared in the examples using the procedure described in the referenced ASTM Test Methods. The adhesive formulation to be tested was coated onto Mitsubishi Hostaphan™ primed polyester film. A test sample was prepared by adhering a 12.7-millimeter (12.7-mm) wide tape to a glass plate and rolling over the tape twice with 2-kilogram (2-kg) roller. Prior to peel and shear testing, tapes were conditioned for 24 hours in a controlled environment room (23° C./50% relative humidity. The tape was tested on a tensile force tester at a platen speed of 12 inches/minute (305 millimeter/minute (mm/min)). The data reported was as an arithmetic average of three measurements. The averaged values were expressed in Newtons per decimeter (N/dm).

Shear Strength Test [ASTM D-3654/D 3654M 06]

The test measures the static shear strength of an adhesive tape in at elevated temperature (70° C.) from when one end of the tape is adhered to a stainless steel plate, suspended vertically, and a weight is attached to the free end of the tape.

70° C. Shear: A test sample was prepared from the conditioned tapes prepared in the examples. A 12.7-mm wide by 25.4-mm long tape was adhered to one edge of a stainless steel plate so that it overlapped the panel by 12.7 mm, and a 2-kg roller was rolled twice over the portion of tape adhered to the panel. A 0.5-kg weight was attached to the free end of the tape, and the panel was suspended vertically in an oven set at 70° C. The time, in minutes, for the tape to fall from the panel was measured and the time to failure and the mode of failure was recorded. The failure mode can be adhesive (a) in which the adhesive pulls away cleanly from the panel or the tape backing or cohesive (c) in which the adhesive splits and part of the adhesive is left on the tape and part is left on the tape backing. The test was terminated if failure had not occurred in 10,000 minutes and the results recorded. The data reported was as an arithmetic average of three measurements.

TABLE 1

Raw materials used for these examples are described in the table below.

| Chemical Abbreviation | Chemical Name | Chemical Company |
|---|---|---|
| IOA | Isooctyl acrylate | 3M Co, Cordova, IL USA |

TABLE 1-continued

Raw materials used for these examples are described in the table below.

| Chemical Abbreviation | Chemical Name | Chemical Company |
|---|---|---|
| AA | Acrylic acid | Alfa Aesar, Ward Hill, MA USA |
| 4-HBAGE | 4-hydroxybutyl acrylate glycidylether | Nippon Kasei Chemical Co. Ltd., Tokyo, Japan |
| HDDA | 1,6 hexanediol diacrylate | Alfa Aesar, Lancaster, PA USA |
| Hampford | Bis(4-t-butylphenyl) iodonium hexafluoroantimonate | Hampford research Inc., Stratford, CT USA |
| Epon-828 | bisphenol-A/epichlorohydrin based epoxy resin | Momentive, Columbus, OH USA |
| ERL-4221 | 3,4 Epoxy cyclohexyl methyl 3,4 epoxy cyclohexyl carboxylate epoxy resin | DOW Chemical Co., Midland MI, USA |
| Foral 85LB | Foral 85LB | Eastman Chemical Co., Kingsport, Tennessee USA |
| Irgacure 651 | 2,2-dimethoxy-2-phenylacetophenone | Sartomer Co., West Chester, PA |

Preparation of the Base Syrup Copolymer Containing Epoxy Acrylate Comonomer

A one quart jar was charged with 89 g of isooctyl acrylate (IOA, 89 parts), 10 g of acrylic acid (AA, 10 parts), 1 g of 4-hydroxybutyl acrylate glycidylether, (4-HBAGE, 1 part), and 0.04 g (0.04 phr) of Irgacure™ 651. The monomer mixture was purged with nitrogen for 5 minutes then exposed to low intensity ultraviolet radiation until a coatable syrup copolymer was prepared.

The pre-adhesive polymer syrup was blended with additional 0.16 g (0.16 phr) of the Irgacure™ 651 and with 0.2 g (0.2 phr) bis(4-t-butylphenyl) iodonium hexafluoroantimonate (Hampford) as shown in Table 2.

Compounding of Epoxy Resin Containing Final Syrups:

A 25 dram vial was charged with 20 g (100 phr) of base syrup from Formulation A in Table 2 and 0.2 g (1 phr) Epon-828 to produce Example 2 in Table 3. All other samples were made in a similar manner by using different epoxy resins and varying resin concentrations as shown in Tables 3-4. The formulation was then coated onto Mitsubishi Hostaphan™ primed polyester film at a 2 mil (~50 micrometers) thickness for the syrup pre-adhesive formulations and cured by UVA light (550 mJ/cm$^2$).

Compounding of Epoxy Resin and Tackifier Containing Final Syrups:

A 25 dram vial was charged with 20 g (100 phr) of base syrup from Formulation A in Table 2, 1.0 g (10 phr) Foral 85LB, and 0.2 g (1 phr) Epon-828 to produce Example 9 in Table 5. All other samples were made in a similar manner by using different epoxy resins, varying resin concentrations, and using various tackifier loadings as shown in Tables 5-6. The formulation was then coated onto Mitsubishi Hostaphan™ primed polyester film at a 2 mil (~50 micrometers) thickness for the syrup pre-adhesive formulations and cured by UVA light (550 mJ/cm$^2$).

Preparation of the Syrup for IOA/AA Control Samples Containing Optional Tackifier A one quart jar was charged with 45 g of isooctyl acrylate (IOA, 90 parts), 5 g of acrylic acid (AA, 10 parts), and 0.02 g (0.04 phr) of Irgacure™ 651. The monomer mixture was purged with nitrogen for 5 minutes then exposed to low intensity ultraviolet radiation until a coatable syrup copolymer was prepared, after which an additional 0.08 g (0.16 phr) of the Irgacure™ 651, 0.04 g (0.08 phr) of HDDA, and optionally 5 g (10 phr) Foral 85LB tackifier were added as shown in Table 7. The formulations were then coated on Mitsubishi Hostaphan™ primed polyester film at a 2 mil (~50 micrometers) thickness for the syrup pre-adhesive formulations and cured by UVA light (550 mJ/cm$^2$).

Peel Adhesion and Shear Strength were measured for tapes prepared from these adhesives as described in the test methods above.

TABLE 2

Compositions of formulations of base syrup containing bis(4-t-butylphenyl) iodonium hexafluoroantimonate (Hampford) and 4-hydroxybutyl acrylate glycidylether (4-HBAGE).

| Formulation | IOA (wt %) | AA (wt %) | 4-HBAGE (wt %) | Hampford (phr) |
|---|---|---|---|---|
| A | 89 | 10 | 1 | 0.2 |

TABLE 3

Adhesive formulations of the Formulation A base syrups in Table 2 that contain various levels of Epon-828 and irradiated with UVA.

| Example | Formulation A (phr) | Epon-828 (phr) | Shear (70° C.) | Peel (0.305 m/min) (N/dm) |
|---|---|---|---|---|
| C1 | 100 | 0 | 10000 | 58 |
| 2 | 100 | 1 | 10000 | 54 |
| 3 | 100 | 3 | 10000 | 51 |
| 4 | 100 | 5 | 10000 | 58 |

TABLE 4

Adhesive formulations of the Formulation A base syrups in Table 2 that contain various levels of ERL-4221 and irradiated with UVA.

| Experimental Reference | Formulation A (phr) | ERL-4221 (phr) | Shear (70° C.) | Peel (0.305 m/min) (N/dm) |
|---|---|---|---|---|
| C5 | 100 | 0 | 10000 | 58 |
| 6 | 100 | 1 | 10000 | 67 |
| 7 | 100 | 3 | 10000 | 62 |
| 8 | 100 | 5 | 10000 | 55 |

TABLE 5

Adhesive formulations of the base syrups in Table 2 that contain the tackifier Foral 85LB, various levels Epon-828 or ERL-4221, and irradiated with UVA.

| Example | Formulation A (phr) | Formulation B (phr) | Foral 85LB (phr) | Epon-828 (phr) | ERL-4221 (phr) | Shear (70° C.) | Peel (0.305 m/min) (N/dm) |
|---|---|---|---|---|---|---|---|
| 9 | 100 | 0 | 10 | 1 | 0 | 10000 | 51 |
| 10 | 100 | 0 | 10 | 3 | 0 | 10000 | 53 |
| 11 | 100 | 0 | 10 | 5 | 0 | 10000 | 56 |
| 12 | 100 | 0 | 10 | 0 | 1 | 10000 | 60 |
| 13 | 100 | 0 | 10 | 0 | 3 | 10000 | 46 |
| 14 | 100 | 0 | 10 | 0 | 5 | 10000 | 35 | c stands for cohesive mode of failure.

TABLE 6

Adhesive formulations of the base syrups in Table 2 that contain various levels of the tackifier Foral 85LB, Epon-828 or ERL-4221, and irradiated with UVA.

| Example | Formulation A (phr) | Foral 85LB (phr) | Epon-828 (phr) | ERL-4221 (phr) | Shear (70° C.) | Peel (0.305 m/min) (N/dm) |
|---|---|---|---|---|---|---|
| 15 | 100 | 15 | 5 | 00 | 10000 | 56 |
| 16 | 100 | 20 | 5 | 0 | 6$^c$ | 74 |
| 17 | 100 | 25 | 5 | 0 | 2$^c$ | 119 |
| 18 | 100 | 30 | 5 | 0 | 0$^c$ | 76 |
| 19 | 100 | 15 | 0 | 5 | 10000 | 28 |
| 20 | 100 | 20 | 0 | 5 | 10000 | 23 |
| 21 | 100 | 25 | 0 | 5 | 10000 | 19 |
| 22 | 100 | 30 | 0 | 5 | 10000 | 20 |

$^c$stands for cohesive mode of failure.

TABLE 7

Control formulations containing HDDA and optionally Foral 85LB tackifier but not containing epoxy monomers or onium salts.

| Example | IOA (wt %) | AA (wt %) | Foral 85LB (phr) | HDDA (phr) | Shear (70° C.) | Peel (0.305 m/min) (N/dm) |
|---|---|---|---|---|---|---|
| C23 | 90 | 10 | 0 | 0.16 | 1175$^c$ | 55 |
| C24 | 90 | 10 | 10 | 0.16 | 3$^c$ | 36 |
| C25 | 90 | 10 | 0 | 0.16 | 3377$^c$ | 69 |
| C26 | 90 | 10 | 10 | 0.16 | 10$^c$ | 53 |
| C27 | 90 | 10 | 0 | 0.16 | 307$^c$ | 55 |

$^c$stands for cohesive mode of failure.

Example 28

Preparation of the Syrup Containing Copolymer with Pendent Acid Groups and Epoxy Resin Crosslinker A one quart jar was charged with 20 g of IOA/AA syrup (100 parts) and 0.2 g of 3,4 epoxy cyclohexyl methyl 3,4 epoxy cyclohexyl carboxylateacrylic acid (1 parts). The monomer mixture was purged with nitrogen for 5 minutes and then exposed to low intensity ultraviolet radiation until a coatable syrup copolymer was prepared.

Coating and Curing

The pre-adhesive polymer syrup was blended with additional Irgacure™ 651 (0.16 phr), mixed by jar rolling for 24 hours, then coated on Mitsubishi Hostaphan™ primed polyester film at a 2 mil (~50 micrometers) thickness and cured by UVA light (550 mJ/cm$^2$).

TABLE 8

| | IOA (wt %) | AA (wt %) | 4HBAGE (wt %) | ERL-4221 (phr) | Shear (70° C.) | Peel (0.305 m/min) (N/dm) |
|---|---|---|---|---|---|---|
| Example 28 | 90 | 10 | 0 | 1 | 10000 | 47 |

Example 28 is identical to Example 6 with the exception that the epoxy-functional (meth)acryloyl monomer (i.e. 4-HBAGE) has been omitted from the (meth)acrylic solute copolymer and the ionic photoacid generator (i.e. Hampford) has been omitted. The high shear value is indicative of crosslinking.

The invention claimed is:

1. A crosslinkable syrup polymer composition comprising:
   a) a (meth)acrylic solute copolymer comprising interpolymerized monomers comprising:
      i) an alkyl(meth)acrylate monomer;
      ii) an epoxy-functional (meth)acryloyl monomer in an amount of 1 to 20 parts by weight relative to 100 parts by weight of the total monomer of the solute copolymer;
      iii) an acid-functional ethylenically unsaturated monomer;
      iv) an optional non-acid functional polar monomer;
      v) an optional vinyl monomer, and
   b) an epoxy resin in an amount of 0.1 to 10 parts of the solute copolymer;
   c) optionally an ionic photoacid generator; and
   d) a solvent monomer mixture comprising an alkyl(meth)acrylate monomer;
   wherein the crosslinkable syrup polymer composition does not contain a multifunctional (meth)acrylate or chlorinated triazine crosslinker.

2. The crosslinkable syrup polymer composition of claim 1 wherein the acid-functional ethylenically unsaturated monomer of said solute copolymer is used in amounts of 1 to 15 parts by weight of the 100 parts of the total monomer of the solute copolymer.

3. The crosslinkable syrup polymer composition of claim 1 wherein the epoxy resin comprises on average greater than 1 polymerizable epoxy group per molecule.

4. The crosslinkable syrup polymer composition of claim 1 wherein the (meth)acrylic solute copolymer comprises interpolymerized monomers comprising:
   i) 85 to 99 parts by weight of the alkyl (meth)acrylate;
   ii) 1 to 20 parts by weight of the epoxy-functional (meth)acryloyl monomer; and
   iii) 1 to 15 parts by weight of the acid-functional ethylenically unsaturated monomer; based on 100 parts of the total monomer content of the solute copolymer.

5. The crosslinkable syrup polymer composition of claim 1 wherein the epoxy-functional (meth)acryloyl monomer is of the formula:

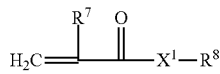

wherein:
R$^7$ is —H or C$_1$-C$_4$ alkyl;
X$^1$ is —O— or —NR$^9$—; and
R$^8$ is an epoxy-substituted hydrocarbyl group.

6. The crosslinkable syrup polymer composition of claim 5 wherein R$^8$ is

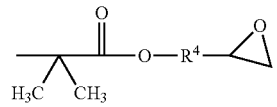

where R$^4$ is a C$_1$-C$_6$ alkylene.

7. The crosslinkable syrup polymer composition of claim 1 wherein the epoxy-functional (meth)acryloyl monomer is of the formula:

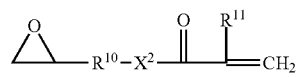

wherein:
R$^{10}$ is a (hetero)hydrocarbyl group;
R$^{11}$ is —H or —H or C$_1$-C$_4$ alkyl; and
X$^2$ is —NR$^{12}$— or —O—.

8. The crosslinkable syrup polymer composition of claim 1 wherein the solvent monomer mixture comprises
   i) an optional epoxy-functional (meth)acryloyl monomer
   i) an acid-functional ethylenically unsaturated monomer;
   iii) an optional non-acid functional polar monomer; and
   iv) an optional vinyl monomer.

9. The crosslinkable syrup polymer composition of claim 1 wherein the (meth)acrylic copolymer further comprises interpolymerized monomers comprising a non-acid-functional polar monomer and a vinyl monomer.

10. The crosslinkable syrup polymer composition of claim 1 wherein the ionic photoacid generator is used in an amount of 0.01 to 1 part by weight, relative to 100 parts by weight of the epoxy-functional copolymer.

11. The crosslinkable syrup polymer composition of claim 10 wherein the ionic photoacid generator is selected from iodonium salts; sulfonium salts, sulfoxonium salts, selenonium salts, sulfoxonium salts, phosphonium salts, and arsonium salts.

12. The crosslinkable syrup polymer composition of claim 11 wherein the salts are selected from SbF$_6^-$, AsF$_6^-$, PF$_6^-$, B(C$_6$F$_5$)$_4^-$ and BF$_4^-$ and B(C$_6$F$_5$)$_4^-$ anions.

13. A pressure-sensitive adhesive composition prepared from a crosslinkable composition of claim 1.

14. A pressure-sensitive adhesive article comprising a coating of the adhesive of claim 13 on a backing.

15. The crosslinkable syrup polymer composition of claim 1 wherein the epoxy resin contains cyclohexene groups.

16. The crosslinkable syrup polymer composition of claim 1 wherein the crosslinkable syrup polymer composition does not contain ionic photoacid generator.

17. The crosslinkable syrup polymer composition of claim 1 wherein the (meth)acrylic copolymer comprises no greater than 5 parts by weight of the epoxy resin.

* * * * *

UNITED STATES PATENT AND TRADEMARK OFFICE
CERTIFICATE OF CORRECTION

PATENT NO.       : 9,217,099 B2
APPLICATION NO.  : 13/798807
DATED            : December 22, 2015
INVENTOR(S)      : Mahoney et al.

Page 1 of 1

It is certified that error appears in the above-identified patent and that said Letters Patent is hereby corrected as shown below:

In the specification

Column 4
Lines 50-51, delete "diphenylstilbino;" and insert -- diphenylstilbene; --, therefor.

Line 61, delete "normucleophilic" and insert -- nonnucleophilic --, therefor.

Column 5
Line 2, delete "diarlyiodonium" and insert -- diaryliodonium --, therefor.

Column 7
Line 51, delete "Tg" and insert -- $T_g$ --, therefor.

Line 57, delete "3,3,5 trimethylcyclohexyl" and insert -- 3,3,5-trimethylcyclohexyl --, therefor.

Line 60, delete "$T_g$s" and insert -- $T_g$ --, therefor.

Column 8
Line 55, delete "N-vinylpyrrolidinone." and insert -- N-vinylpyrrolidone. --, therefor.

In the claims

Column 24
Line 7, Claim 6, delete "$C_1$-$C_6$" and insert -- $C_1$-$C_6$ --, therefor.

Signed and Sealed this
Ninth Day of August, 2016

Michelle K. Lee
*Director of the United States Patent and Trademark Office*